US010030187B2

(12) United States Patent
May

(10) Patent No.: US 10,030,187 B2
(45) Date of Patent: Jul. 24, 2018

(54) POLYMER-BASED DRILLING FLUIDS CONTAINING NON-BIODEGRADABLE PARTICULATES AND METHODS FOR USE THEREOF

(71) Applicant: Halliburton Energy Services, Inc., Houston, TX (US)

(72) Inventor: Preston Andrew May, Porter, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/922,497

(22) Filed: Oct. 26, 2015

(65) Prior Publication Data

US 2016/0046852 A1    Feb. 18, 2016

Related U.S. Application Data

(63) Continuation-in-part of application No. PCT/US2014/049705, filed on Aug. 5, 2014.

(51) Int. Cl.
*E21B 37/06* (2006.01)
*C09K 8/12* (2006.01)

(52) U.S. Cl.
CPC .................... *C09K 8/12* (2013.01)

(58) Field of Classification Search
CPC .............. E21B 37/06; E21B 41/02
USPC ........................ 175/72
See application file for complete search history.

(56) References Cited

U.S. PATENT DOCUMENTS

| 2,570,947 A | 10/1951 | Himel et al. |
| 3,989,630 A | 11/1976 | Walker |
| 3,993,570 A | 11/1976 | Jackson et al. |
| 4,172,055 A | 10/1979 | DeMartino |
| 4,363,736 A | 12/1982 | Block |
| 4,629,573 A | 12/1986 | Raines |
| 5,728,652 A | 3/1998 | Dobson, Jr. et al. |

(Continued)

FOREIGN PATENT DOCUMENTS

| EP | 0731253 A2 | 9/1996 |
| EP | 2075300 A1 | 7/2009 |

(Continued)

OTHER PUBLICATIONS

International Search Report and Written Opinion for PCT/US2014/049705 dated Apr. 13, 2015.

*Primary Examiner* — William D Hutton, Jr.
*Assistant Examiner* — Ashish K Varma
(74) *Attorney, Agent, or Firm* — McDermott Will & Emery LLP

(57) ABSTRACT

Polymer-based drilling fluids may be used as an alternative to drilling fluids containing bentonite or other clay materials, although filter cake formation can often be inadequate when using polymer-based drilling fluids. As a result, drilling methods employing polymer-based drilling fluids may sometimes experience unacceptable fluid loss performance within a borehole. Drilling methods with enhanced fluid loss performance may comprise: providing a drilling fluid comprising a carrier fluid, a viscosity-enhancing polymer, and a plurality of non-biodegradable particulates, the non-biodegradable particulates comprising at least silica particulates; drilling a borehole in the presence of the drilling fluid; and forming a filter cake within the borehole, the filter cake comprising the non-biodegradable particulates.

9 Claims, 1 Drawing Sheet

(56) References Cited

U.S. PATENT DOCUMENTS

| | | |
|---|---|---|
| 7,829,506 B1 | 11/2010 | Tehranchi |
| 7,857,051 B2 | 12/2010 | Abed et al. |
| 8,585,819 B2 | 11/2013 | Al-Bagoury |
| 8,691,737 B2 | 4/2014 | Chatterji et al. |
| 2008/0161209 A1 | 7/2008 | Wood |
| 2013/0220607 A1 | 8/2013 | Phatak et al. |
| 2013/0303412 A1* | 11/2013 | Luyster ............ C09K 8/512 507/236 |
| 2014/0151043 A1 | 6/2014 | Miller et al. |
| 2014/0336087 A1 | 11/2014 | Wetherell |
| 2017/0121586 A1 | 5/2017 | May et al. |

FOREIGN PATENT DOCUMENTS

| | | |
|---|---|---|
| WO | 2013068771 A1 | 5/2013 |
| WO | 2016022101 A1 | 2/2016 |

\* cited by examiner

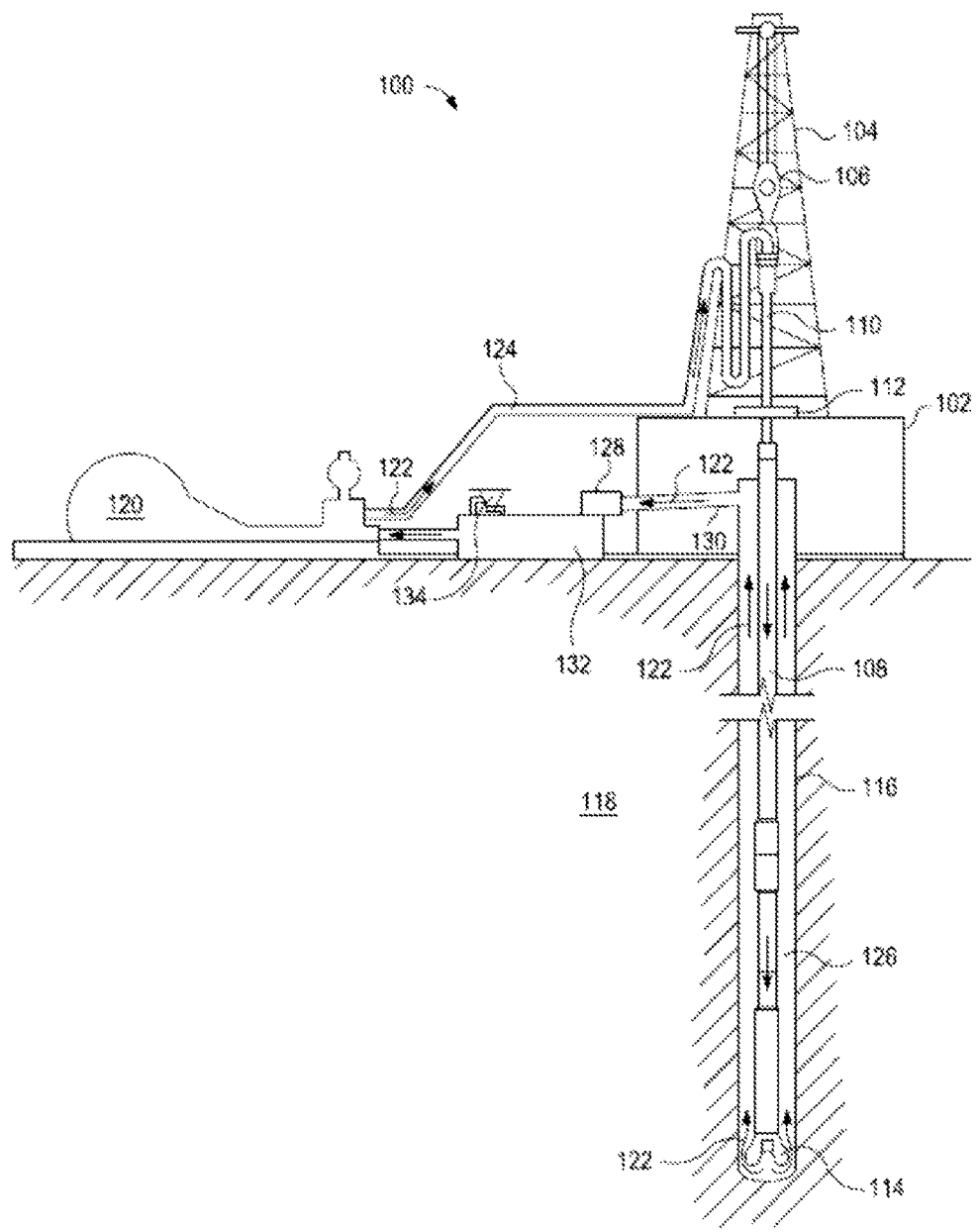

POLYMER-BASED DRILLING FLUIDS CONTAINING NON-BIODEGRADABLE PARTICULATES AND METHODS FOR USE THEREOF

CROSS-REFERENCE TO RELATED APPLICATIONS

The present application is a continuation-in-part of International Patent Application PCT/US2014/49705, filed on Aug. 5, 2014.

BACKGROUND

The present disclosure generally relates to methods for drilling a borehole in a subterranean formation or like geological structure and, more specifically, to polymer-based drilling fluids and methods for their use in mitigating fluid loss during drilling operations.

Earthen boreholes are drilled for a number of applications including, for example, oil and gas exploration and production, minerals exploration and production, water sourcing, and the like. As used herein, the term "borehole" will refer to any elongated pathway excavated in an earthen structure, such as a subterranean formation, regardless of purpose. Construction-related drilling projects can similarly prepare boreholes suitable for laying pipelines or cables, or establishing locations for footings or pilings of a structure. Although these applications may each involve a drilling process of some form, there may be fundamental differences dictating how the drilling process is conducted in one application versus another.

During drilling operations, a drilling fluid is usually used to cool the drill bit, to control pressure within the borehole, and to suspend and transport drill cuttings from the borehole to the earth's surface. It is usually desirable to control loss of the drilling fluid from the borehole into porous features of the subterranean matrix. Although there are a number of reasons that fluid loss may be undesirable during a drilling operation, weakening of the subterranean matrix by excessive fluid incursion is often an overriding concern.

Fluid loss into the subterranean matrix can usually be lessened by forming a filter cake within the borehole. In most instances, the drilling fluid is formulated with materials that promote formation of a filter cake upon initial spurt loss of the drilling fluid to the subterranean matrix. In oil and gas production, the filter cake can also mitigate the premature incursion of various formation fluids into the borehole during drilling, and the filter cake can thereafter be removed to allow production to commence. In other types of drilling applications, however, it is not necessary to remove the filter cake once drilling of the borehole is complete.

As indicated above and discussed further hereinafter, different types of drilling applications may vary in several aspects. Although drilling fluids may function similarly across various drilling applications, the properties of the drilling fluids are usually adapted to focus on the needs of a particular application. For example, mining applications, particularly mineral exploration applications, tend to make use of smaller boreholes and drill bits than do oil and gas applications. The small annular space present within typical mining applications can make less viscous drilling fluids desirable, such that they can be more easily circulated within the borehole. The highly mineralized formations commonly associated with mining applications can also make tailoring of the drilling fluid desirable to accommodate localized conditions of porosity, pH and temperature that may be present. Similarly, water wells, particularly potable water wells, are frequently limited in the types of materials that can be used in formulating a drilling fluid for the well. In many instances, any materials that are introduced into a water well must be NSF certifiable, and a significant number of chemical agents do not meet this requirement.

Drilling fluids often contain a plurality of bridging particulates that collectively form a fluid-blocking filter cake across pore throats and other porous features on the walls of the borehole. Degradable polymers are commonly used for this purpose, particularly in oil and gas exploration and production, where induced-degradation or self-degradation of the bridging particulates may be desirable upon commencing production operations. Degradable polymers, particularly biodegradable polymers, may also be particularly desirable from an environmental standpoint in such applications.

In other applications, degradable polymers and other degradable materials can be undesirable, and counter intuitively can represent an environmental concern. For example, in water well drilling, polymer degradation products may result in contamination of a water source encroached by the borehole, possibly making the water source unsuitable for use or consumption. Biodegradable polymers lost to the subterranean matrix in such applications can further provide a food source for various bacteria, possibly resulting in formation damage and/or water source fouling from uncontrolled bacteria growth. Related issues can also be encountered in mineral wells and like boreholes. For example, the generation of degradation products in a mineral well can further complicate an already complex mineralogical profile within the borehole.

Some drilling fluids use bentonite or other clay derivatives in order to convey viscosity to the fluid and to promote formation of a filter cake during drilling. The use of bentonite and other clays can prove problematic in a number of instances. In concentrations effective for promoting fluid loss control, clays can often produce drilling fluid viscosities that are too high for effective use in mineral wells and related types of boreholes. Due to their layered molecular structure, clays are also susceptible to swelling in the presence of various ionic materials, such as subterranean brines, which can result in further changes in viscosity. Costs associated with disposal of clay-containing drilling fluids can also be highly problematic, and some locales have even regulated or banned their use.

Polymer-based drilling fluids, particularly those containing substantially non-degradable polymers, may be used as an alternative to clay-based drilling fluids in some instances. Although they may sometimes exhibit comparable rheological performance, polymer-based drilling fluids often display inferior fluid loss control properties compared to clay-based drilling fluids. Without being bound by any theory or mechanism, it is believed that the layered structure of clay particles may result in more effective bridging during filter cake formation than can polymer chains.

BRIEF DESCRIPTION OF THE DRAWING

The following FIGURE is included to illustrate certain aspects of the present disclosure and should not be viewed as an exclusive embodiment. The subject matter disclosed is capable of considerable modifications, alterations, combinations, and equivalents in form and function, as will occur to one having ordinary skill in the art and the benefit of this disclosure.

FIG. 1 shows an illustrative schematic of a drilling assembly using the drilling fluids of the present disclosure, according to one or more embodiments.

DETAILED DESCRIPTION

The present disclosure generally relates to methods for drilling a borehole in a subterranean formation or like geological structure and, more specifically, to polymer-based drilling fluids and methods for their use in mitigating fluid loss during drilling operations.

One or more illustrative embodiments incorporating the features of the present disclosure are presented herein. Not all features of a physical implementation are necessarily described or shown in this application for the sake of clarity. It is to be understood that in the development of a physical implementation incorporating the embodiments of the present disclosure, numerous implementation-specific decisions may be made to achieve the developer's goals, such as compliance with system-related, business-related, government-related and other constraints, which may vary by implementation and from time to time. While a developer's efforts might be time-consuming, such efforts would be, nevertheless, a routine undertaking for one having ordinary skill in the art and the benefit of this disclosure.

As discussed above, the use of bentonite and other clay derivatives in drilling fluids for purposes of achieving fluid loss control can be exceedingly problematic. Due to these difficulties, the present inventor investigated whether alternative materials, particularly non-biodegradable materials, might provide effective fluid loss control during drilling operations conducted with polymer-based drilling fluids.

Surprisingly and advantageously, the present inventor discovered that non-degradable particulates comprising at least silica particulates may be operable to provide effective fluid loss control during drilling operations conducted with polymer-based drilling fluids. Silica particulates have the additional advantage of being non-biodegradable, which can be beneficial when used in conjunction with various drilling applications, such as those discussed above. Additional advantages of silica particulates are discussed further hereinbelow.

Although silica is sometimes considered to be an undesirable material in oilfield operations due to the permeability reduction and scaling issues that can result from deposition of insoluble silicates and aluminosilicates, particularly when acidizing a siliceous formation, these issues are less problematic in many types of drilling operations. In particular, silica particulates are sufficiently chemically inert for use in drilling operations for water wells and mineral wells, for example. The low chemical and biological reactivity of silica particulates makes this material essentially non-biodegradable and NSF certifiable.

Further, silica particulates are also inexpensive and are available in bulk quantities from numerous manufacturers in a variety of particle sizes, particle size distributions, and morphologies. Advantageously, the size of the silica particulates, or, more generally, the size of the non-biodegradable particulates, may be selected to promote fluid loss control to a desired degree when drilling a borehole. Specifically, provided that they can accomplish effective bridging in a borehole, smaller silica particulates may promote better fluid loss control performance than do larger silica particulates, thereby allowing relatively low concentrations of the silica particulates to be used in formulating the drilling fluids described herein. By using low concentrations of silica particulates in the drilling fluids described herein, cost of goods issues may be minimalized and the drilling fluids' rheological performance may not be impacted to an appreciable degree at concentrations suitable to promote fluid loss control. Moreover, silica particulates may promote effective fluid loss control at solids concentrations that are much lower than are possible with bentonite and other clay derivatives, thereby further highlighting the viscosity advantages that the present drilling fluids may hold over current state of the art clay-based drilling fluids. The low viscosity state afforded by the drilling fluids of the present disclosure can be particularly advantageous when drilling spatially confined boreholes, such as those used in mineral exploration. Instead of the rheological performance of the drilling fluid being dictated primarily by the silica particulates, the drilling fluid's viscosity can be readily regulated by altering the quantity of a viscosity-enhancing polymer included in the drilling fluid. Suitable viscosity-enhancing polymers include acrylamide polymers, such as partially hydrolyzed polyacrylamides, various examples of which are discussed in more detail hereinbelow. In addition, acrylamide polymers are also generally non-biodegradable and may be advantageous in the various aspects discussed above. Further, when a partially hydrolyzed polyacrylamide is used as the viscosity-enhancing polymer during a drilling process, it may provide additional benefits of shale and clay stabilization to an earthen formation in which a borehole is being constructed.

In addition to the size of the silica particulates, the morphology and surface area of the silica particulates may be adjusted to promote fluid loss control. In particular, the inventor discovered that precipitated amorphous silica particulates having a high surface area may be very effective for promoting fluid loss control, especially compared to crystalline silica particulates of similar size. Amorphous silica particulates may possess a further advantage over crystalline silica particulates in that the former represents a much lower inhalation health hazard than does the latter.

Yet another advantage of silica particulates compared to other types of non-biodegradable particulates, particularly bentonite and other clay derivatives, is that silica particulates are uncharged. Therefore, silica particulates are not especially prone toward swelling in the presence of ionic materials, such as subterranean brines. The non-swelling nature of silica particulates can again be advantageous for maintaining a drilling fluid with a low viscosity state.

In various embodiments, drilling fluids described herein may comprise a carrier fluid, a viscosity-enhancing polymer, and a plurality of non-biodegradable particulates. The non-biodegradable particulates may comprise at least silica particulates.

In some embodiments, suitable carrier fluids may comprise an aqueous carrier fluid. Suitable aqueous carrier fluids for use in conjunction with the drilling fluids and drilling methods described herein may include any aqueous fluid used in subterranean operations. Specifically, suitable aqueous carrier fluids may include, for example, fresh water, saltwater (e.g., water containing one or more salts dissolved therein), brine (e.g., saturated salt water), seawater, or any combination thereof. Other aqueous carrier fluid sources are also possible, and the aqueous carrier fluid may be from any source, provided that it does not contain components that adversely affect the stability and/or performance of the drilling fluids of the present disclosure. In certain embodiments, the density and/or viscosity of the aqueous carrier fluid may be adjusted, among other purposes, to provide additional particulate transport and suspension capabilities. In certain embodiments, the pH of the aqueous carrier fluid may be adjusted using an acid, base, buffer, or the like. In illustrative embodiments, the pH of the aqueous carrier fluid may range between about 4 and about 11, or between about 5 and about 9.

In some embodiments of the present disclosure, the non-biodegradable particulates may have a maximum size of about 75 microns, and in other embodiments, the non-degradable particulates may have a maximum size of about 100 microns. The silica particulates may likewise lie within this size range. Above this size, the particulates may become much more difficult to effectively transport and deposit to form a filter cake when used in conjunction with drilling a borehole. In addition, larger particulate sizes may increase abrasion of downhole equipment. Further, larger particulate sizes may also result in stratification of a dry powder before mixing in a carrier fluid to form a slurry, thereby resulting in inconsistent drilling fluid performance. In other various embodiments, a minor portion of the non-biodegradable particulates may reside above a particle size of about 75 microns. For example, in some embodiments, the non-biodegradable particulates may have a $d_{90}$ value of about 75 microns, meaning that at most about 10% of the particulates have a size greater than a 75 micron cutoff size.

Below the maximum desired size, smaller non-biodegradable particulates may more effectively promote fluid loss control and have a lesser impact on the rheological performance of a polymer-based drilling fluid. For example, a drilling fluid containing silica particulates with a $d_{50}$ of 3.6 microns may be more effective at promoting fluid loss control than a drilling fluid containing silica particulates with a $d_{50}$ of 20 microns. Moreover, amorphous silica particulates may promote superior fluid loss control performance compared to crystalline silica particulates having a comparable size.

In some embodiments of the drilling fluids described herein, the non-biodegradable particulates may have a maximum size of about 60 microns, or a maximum size of about 50 microns, or a maximum size of about 40 microns, or a maximum size of about 30 microns, or a maximum size of about 25 microns, or a maximum size of about 20 microns, or a maximum size of about 15 microns, or a maximum size of about 10 microns. In more specific embodiments, the non-degradable particulates may range between about 1 micron and about 25 microns in size, or between about 1 micron and about 20 microns in size, or between about 1 micron and about 15 microns in size, or between about 1 micron and about 10 microns in size. In alternative embodiments of the present disclosure, silica nanoparticles may also be used.

In various embodiments, non-biodegradable particulates suitable for use in the drilling fluids described herein may comprise any particulate material falling within the above size ranges and being substantially non-swellable and preferably chemically inert. In some embodiments, suitable non-swellable particulates may comprise non-ionic materials, of which silica particulates are an illustrative example. Such non-biodegradable particulates may also be used in combination with silica particulates in the embodiments of the present disclosure.

In more specific embodiments of the present disclosure, suitable non-biodegradable particulates may comprise at least silica particulates. As used herein, the term "silica particulates" will refer to naturally occurring silica, processed naturally occurring silica, synthetic silica or any combination thereof. Processing of naturally occurring silica may comprise, for example, grinding and/or sieving a naturally occurring silica to produce a desired particle size. Synthetic silica may comprise precipitated amorphous silica, which may have a high porosity and high surface area for promoting fluid loss control in the embodiments of the present disclosure. Optionally, grinding and/or sieving of precipitated amorphous silica may also take place. Other non-biodegradable particulates that may also be suitable alternatives to silica particulates for use in the embodiments described herein include, for example, alumina particulates, glass microparticles and microspheres, and ceramic microparticles and microspheres. Calcium carbonate particulates may also be suitable non-biodegradable particulates in some embodiments. Although non-biodegradable, calcium carbonate is not particularly chemically inert, and its chemical degradation (e.g., by acids) can promote solubilization of calcium- or carbonate-sensitive polymers such as partially hydrolyzed polyacrylamide polymers, for example.

In further embodiments, mixtures of non-biodegradable particulates having differing ranges of particle sizes may be used in the drilling fluids described herein. By mixing two or more populations of non-biodegradable particulates having differing particle size distributions, particularly non-overlapping particle size distributions, the resulting population of non-biodegradable particulates may have a bimodal or multi-modal particle size distribution. Bimodal or multi-modal particle size distributions may result in more efficient packing of the non-biodegradable particulates when forming a filter cake and provide for more effective fluid loss control.

In more particular embodiments of the present disclosure, the non-biodegradable particulates may comprise silica particulates having a maximum size of about 40 microns. In still more particular embodiments, the non-biodegradable particulates may comprise silica particulates having a maximum size of about 25 microns, or a maximum size of about 20 microns, or a maximum size of about 15 microns, or a maximum size of about 10 microns, or a maximum size of about 5 microns.

In still more specific embodiments, the non-biodegradable particulates may comprise silica particulates in which at least a majority of the silica particulates (i.e., about 50% or greater in number) range between about 1 micron and about 25 microns in size. In some embodiments, at least a majority of the silica particulates may range between about 1 micron and about 25 microns in size and the balance of the silica particulates may be about 75 microns or less in size. In more particular embodiments, the silica particulates may have a $d_{90}$ value of about 75 microns or less. In some embodiments, at least a majority of the silica particulates may range between about 1 micron and about 25 microns in size and the balance of the silica particulates may be about 40 microns or less in size. In other more particular embodiments, the silica particulates may have a $d_{90}$ value of about 40 microns or less.

Although the drilling fluids described herein may comprise silica particulates in some embodiments, other non-biodegradable particulates may also be present in addition to silica particulates, as discussed above. Although various non-biodegradable particulates may be present in the drilling fluids described herein, the drilling fluids may be substantially free of bentonite or other clay materials in some embodiments. By keeping the drilling fluids substantially free of bentonite and like clay materials, the previously discussed issues associated with clay-based drilling fluids may be lessened or avoided entirely.

Suitable concentrations of the non-biodegradable particulates in the drilling fluids described herein may range between about 0.2 pounds per barrel (ppb) and about 2 ppb. In more particular embodiments, the non-biodegradable particulates may range in concentration between about 0.5 ppb and about 2 ppb. In other various embodiments, suitable concentrations of the non-biodegradable particulates in the drilling fluids described herein may range between about 0.05 ppb and about 1.5 ppb, or between about 0.5 ppb and about 1.25 ppb. In still other various embodiments, the non-biodegradable particulates, particularly silica particulates, may be present in the drilling fluids at a concentration of about 0.05 ppb to about 1.5 ppb or at a concentration of about 0.1 ppb to about 0.7 ppb.

In various embodiments, the viscosity of the drilling fluids described herein may be adjusted by regulating the amount of the viscosity-enhancing polymer that is present in the drilling fluids. In some embodiments, the viscosity-enhancing polymer may comprise a partially hydrolyzed polyacrylamide. As used herein, the term "partially hydrolyzed polyacrylamide" will refer to an acrylamide polymer or co-polymer in which a portion of the amide side chains have been hydrolyzed to carboxylic acids or a salt thereof. Particularly suitable partially hydrolyzed polyacrylamides may include, for example, POLY-BORE, EZ-MUD, EZ-MUD GOLD, EZ-MUD DP, and QUIK-MUD GOLD, which are available from Halliburton Energy Services, Inc. Other viscosity-enhancing polymers may also be suitable for use in the drilling fluids described herein and will be familiar to one having ordinary skill in the art. Other illustrative viscosity-enhancing polymers that may be used in the drilling fluids of the present disclosure include, for example, high molecular weight hydroxyethylcellulose, polyanionic cellulose, polyacrylate and polymethacrylate polymers, polyacrylamide and polymethacrylamide polymers, acrylamide methylpropane sulfonate polymers and copolymers, maleic anhydride polymers and copolymers, and the like. Generally, alternative suitable viscosity-enhancing polymers also have at least the characteristic of non-biodegradability. The viscosity of the drilling fluids may lie within a varying range suitable for use in the envisioned applications for the drilling fluid, such as those discussed illustratively elsewhere herein. For these and related applications, the viscosity of the drilling fluids of the present disclosure may be maintained in a desirably low range. In various embodiments, the drilling fluids described herein may have a viscosity not exceeding about 35 cP. In more particular embodiments, the drilling fluids may have a viscosity ranging between about 5 cP and about 35 cP, or between about 5 cP and about 30 cP, or between about 10 cP and about 25 cP.

In still other various embodiments, the drilling fluids described herein may further include numerous other components such as, for example, salts, pH control additives, foaming agents, antifoaming agents, breakers, biocides, additional fluid loss control agents, stabilizers, chelating agents, scale inhibitors, gases, mutual solvents, particulates, corrosion inhibitors, oxidizing agents, reducing agents, antioxidants, relative permeability modifiers, other viscosifying agents, proppant particulates, gravel particulates, scale inhibitors, emulsifying agents, de-emulsifying agents, surfactants, dispersants, iron control agents, clay control agents, flocculants, scavengers, lubricants, friction reducers, weighting agents, hydrate inhibitors, consolidating agents, any combination thereof, and the like. A person having ordinary skill in the art and the benefit of this disclosure will recognize when such additional components should be included in a drilling fluid used to produce a particular type of borehole, as well as the appropriate amounts to include in the drilling fluid.

Methods for drilling a borehole in a subterranean formation or like earthen structure are also described herein. In various embodiments, the drilling methods may comprise providing a drilling fluid comprising a carrier fluid, a viscosity-enhancing polymer, and a plurality of non-biodegradable particulates comprising at least silica particulates; drilling a borehole in the presence of the drilling fluid; and forming a filter cake within the borehole, the filter cake comprising the non-biodegradable particulates.

In some embodiments, the methods may comprise a "drill in" process. Further, the drilling fluids described herein may be used in both normal and reverse circulation drilling techniques.

In more particular embodiments, the drilling fluids of the present disclosure may be used in conjunction with drilling a water well or a mineral exploration well. That is, in some embodiments, the borehole being drilled may define a portion of a water well or a mineral exploration well. In other various embodiments, the drilling fluids may be used in conjunction with drilling a wellbore for exploration and/or production of a hydrocarbon resource.

In some embodiments, forming the filter cake within the borehole may comprise contacting the outside walls of the borehole (i.e., the exposed subterranean surface of the earthen formation) with the drilling fluid, and passing at least a portion of the carrier fluid into the porosity of the earthen formation (i.e., through spurt loss). As the carrier fluid passes into the porosity of the earthen formation, it may deposit the non-biodegradable particulates as the filter cake, eventually shutting off flow into the formation's porosity as the filter cake builds in thickness.

In some embodiments, the methods described herein may further comprise removing the filter cake from the walls of the borehole. Removing at least a portion of the filter cake from the borehole can allow the resumption of fluid flow into the interior of the borehole from an earthen formation. In illustrative embodiments, mechanical techniques may be used to promote removal of the filter cake. In other various embodiments, the filter cake may remain in the borehole after the drilling process has been completed. For example, in a water well or a mineral exploration well, the filter cake may be allowed to remain intact in some instances.

The exemplary drilling fluids disclosed herein may directly or indirectly affect one or more components or pieces of equipment associated with the preparation, delivery, recapture, recycling, reuse, and/or disposal of the disclosed drilling fluids. For example, and with reference to FIG. 1, the disclosed drilling fluids may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

One or more of the disclosed components may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed components may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed components may be stored, reconditioned, and/or regulated until added to the drilling fluid 122.

As mentioned above, the disclosed drilling fluids may directly or indirectly affect the components and equipment of the drilling assembly 100. For example, the disclosed drilling fluids may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment. The fluid processing unit(s) 128 may further include one or more sensors, gauges, pumps, compressors, and the like used to store, monitor, regulate, and/or recondition the exemplary drilling fluids.

The disclosed drilling fluids may directly or indirectly affect the pump 120, which representatively includes any conduits, pipelines, trucks, tubulars, and/or pipes used to fluidically convey the drilling fluids downhole, any pumps, compressors, or motors (e.g., topside or downhole) used to drive the drilling fluids into motion, any valves or related joints used to regulate the pressure or flow rate of the drilling fluids, and any sensors (i.e., pressure, temperature, flow rate, and the like), gauges, and/or combinations thereof, and the like. The disclosed drilling fluids may also directly or indirectly affect the mixing hopper 134 and the retention pit 132 and their assorted variations.

The disclosed drilling fluids may also directly or indirectly affect the various downhole equipment and tools that may come into contact with the drilling fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed drilling fluids may also directly or indirectly affect any downhole heat exchangers, valves and corresponding actuation devices, tool seals, packers and other wellbore isolation devices or components, and the like associated with the wellbore 116. The disclosed drilling fluids may also directly or indirectly affect the drill bit 114, which may include, but is not limited to, roller cone bits, PDC bits, natural diamond bits, any hole openers, reamers, coring bits, and the like.

While not specifically illustrated herein, the disclosed drilling fluids may also directly or indirectly affect any transport or delivery equipment used to convey the drilling fluids to the drilling assembly 100 such as, for example, any transport vessels, conduits, pipelines, trucks, tubulars, and/or pipes used to fluidically move the drilling fluids from one location to another, any pumps, compressors, or motors used to drive the drilling fluids into motion, any valves or related joints used to regulate the pressure or flow rate of the drilling fluids, and any sensors (i.e., pressure and temperature), gauges, and/or combinations thereof, and the like.

Embodiments disclosed herein include:

A. Methods for drilling a borehole. The methods comprise: providing a drilling fluid comprising a carrier fluid, a viscosity-enhancing polymer, and a plurality of non-biodegradable particulates, the non-biodegradable particulates comprising at least silica particulates; drilling a borehole in the presence of the drilling fluid; and forming a filter cake within the borehole, the filter cake comprising the non-biodegradable particulates.

B. Drilling fluids. The drilling fluids comprise: a carrier fluid; a viscosity-enhancing polymer; and a plurality of non-biodegradable particulates, the non-biodegradable particulates comprising at least silica particulates.

Each of embodiments A and B may have one or more of the following additional elements in any combination:

Element 1: wherein the silica particulates have a maximum size of about 40 microns.

Element 2: wherein at least a majority of the silica particulates range between about 1 micron and about 25 microns in size.

Element 3: wherein the drilling fluid is substantially free of bentonite.

Element 4: wherein the borehole defines a portion of a water well or a mineral exploration well.

Element 5: wherein the viscosity-enhancing polymer comprises a partially hydrolyzed polyacrylamide or polyanionic cellulose.

Element 6: wherein a viscosity of the drilling fluid ranges between about 5 cP and about 35 cP.

Element 7: wherein the method further comprises removing the filter cake from the borehole.

Element 8: wherein the silica particulates are present in the drilling fluid at a concentration of about 0.05 pounds per barrel to about 1.5 pounds per barrel.

Element 9: wherein the silica particulates are present in the drilling fluid at a concentration of about 0.1 pounds per barrel to about 0.7 pounds per barrel.

By way of non-limiting example, exemplary combinations applicable to A and B include:

The method of A or the drilling fluid of B in combination with elements 1 and 3.

The method of A or the drilling fluid of B in combination with elements 1 and 5.

The method of A or the drilling fluid of B in combination with elements 2 and 3.

The method of A or the drilling fluid of B in combination with elements 2 and 8.

The method of A or the drilling fluid of B in combination with elements 2, 5 and 8.

The method of A or the drilling fluid of B in combination with elements 2 and 9.

The method of A or the drilling fluid of B in combination with elements 2, 5 and 9.

The method of A or the drilling fluid of B in combination with elements 3 and 6.

The method of A in combination with elements 3 and 4.

The method of A in combination with elements 7 and 9.

To facilitate a better understanding of the embodiments of the present disclosure, the following examples of preferred or representative embodiments are given. In no way should the following examples be read to limit, or to define, the scope of the disclosure.

EXAMPLES

Example 1

Fluid Loss Performance of Polymer-Based Drilling Fluids Containing Various Particulates Drilling fluids were formulated by combining water, partially hydrolyzed polyacrylamide viscosity-enhancing polymer having a molecular weight of 1 million, and various types of degradable particulates. The loadings of the partially hydrolyzed polyacrylamide viscosity-enhancing polymer and the degradable particulates in the drilling fluids were each 1 pound per barrel. A control sample containing calcium bentonite as simulated drill cuttings but no degradable particulates was also tested. Fluid loss performance was measured in terms of the quantity of filtrate collected over 30 minutes after passing the drilling fluid (350 mL) through a hardened porous filter paper using an API filter press at ambient temperature and a pressure of 100 psi. Further sample information and testing data is summarized in Table 1 below.

TABLE 1

| Particulate Material | $D_{50}$ Particulate Size (μm) | Volume of Filtrate in mL Collected over 30 Minutes |
| --- | --- | --- |
| Calcium Bentonite | 20 | 130 |
| Crystalline Silica | 20 | 115 |
| Calcium Carbonate | 5 | 75 |
| Crystalline Silica | 5 | 51 |
| Amorphous Precipitated Silica | 3.6 | 35 |

As shown in Table 1, the fluid loss performance generally improved upon decreasing the size of the particulates. There was a further improvement in fluid loss performance upon changing the particulate morphology from crystalline to amorphous. Specifically, amorphous precipitated silica produced better fluid loss performance than did crystalline silica having only a minutely larger particulate size. Comparing crystalline silica and calcium carbonate particulates of equal size, the crystalline silica provided better fluid loss performance.

Example 2

Fluid Loss Performance of Drilling Fluids Containing Amorphous Precipitated Silica Drilling fluids containing varying amounts of one or more viscosity-enhancing polymers and silica particulates in water were formulated as set forth in Tables 2-4 below. The viscosity-enhancing polymers tested were a partially hydrolyzed polyacrylamide having a molecular weight of 20 million, a partially hydrolyzed polyacrylamide having a molecular weight of 1 million, and polyanionic cellulose having a molecular weight between 1 and 2 million, each of which is available from Halliburton Energy Services, Inc. The silica particulates were precipitated amorphous silica particulates and had a $d_{50}$ value of 3.6 microns (Zeothix 265, Huber Engineered Materials). Fluid loss performance was determined in the same manner as in Example 1. Viscosity measurements were obtained using a Fann 35A viscometer and a R1-B1-F1 rotor-bob-torsion spring combination at ambient temperature and pressure.

TABLE 2

| | Sample 1 | Sample 2 | Sample 3 | Sample 4 | Sample 5 | Sample 6 |
| --- | --- | --- | --- | --- | --- | --- |
| Composition | | | | | | |
| Viscosity-Enhancing Polymer (lb/bbl) | PHPA[a] (0.42) | PHPA[a] (0.42) | PHPA[a] (0.42) | PHPA[b] (1.0) | PHPA[b] (1.0) | PAC[c] (1.0) |
| Silica (lb/bbl) | 0.1 | 0.75 | 1.5 | 0.1 | 1.0 | 0.1 |
| Fluid Loss | | | | | | |
| Volume of Filtrate in mL Over 30 Minutes | 25 | 20 | 18 | 120 | 35 | 26 |

[a]partially hydrolyzed polyacrylamide (molecular weight = 20 million)
[b]partially hydrolyzed polyacrylamide (molecular weight = 1 million)
[c]polyanionic cellulose (molecular weight = 1-2 million)

TABLE 3

| | Control | Sample 7 | Sample 8 | Sample 9 |
| --- | --- | --- | --- | --- |
| Composition | | | | |
| Viscosity-Enhancing Polymer (lb/bbl) | PHPA[b]/PAC[c] (0.5/0.5) | PHPA[b]/PAC[c] (0.5/0.5) | PHPA[b]/PAC[c] (0.5/0.25) | PHPA[b]/PAC[c] (0.5/0.1) |

TABLE 3-continued

|  | Control | Sample 7 | Sample 8 | Sample 9 |
|---|---|---|---|---|
| Silica (lb/bbl) | — | 0.1 | 0.25 | 0.5 |
| Fluid Loss |  |  |  |  |
| Volume of Filtrate in mL Over 30 Minutes | 226 | 49 | 43 | 40 |

TABLE 4

|  | Control | Sample 10 |
|---|---|---|
| Composition |  |  |
| Viscosity-Enhancing Polymer (lb/bbl) | PHPA$^a$ (0.42) | PHPA$^a$ (0.42) |
| Surfactant (lb/bbl) | 0.06 | 0.06 |
| Dispersant (lb/bbl) | 0.02 | 0.02 |
| Silica (lb/bbl) | — | 0.1 |
| Rheology |  |  |
| 600 rpm dial reading | 28 | 28 |
| 300 rpm dial reading | 18 | 18 |
| 200 rpm dial reading | 15 | 14.5 |
| 100 rpm dial reading | 10 | 10 |
| 6 rpm dial reading | 3.5 | 3.5 |
| 3 rpm dial reading | 2.5 | 2.53 |
| 10-Second Gel (lb/100 ft$^2$) | 3 | 3 |
| 10-Minute Gel (lb/100 ft$^2$) | 7 | 7 |
| Fluid Loss |  |  |
| Volume of Filtrate in mL Over 30 Minutes | 82 | 25 |

As shown in Table 2 above, various loadings of silica particulates produced good fluid loss performance in drilling fluids containing partially hydrolyzed polyacrylamides with differing molecular weights (Samples 1-5). Much higher fluid loss was observed in control samples where the silica particulates were omitted. For example, complete loss of all 350 mL of fluid occurred when the silica particulates were omitted in a control fluid containing the partially hydrolyzed polyacrylamide having a molecular weight of 1 million. Higher loadings of the silica particulates provided better fluid loss performance. Likewise, silica particulates also produced good fluid loss performance in drilling fluids containing polyanionic cellulose as the viscosity-enhancing polymer. Again, the fluid loss performance was poorer when the silica particulates were not present. For example, the observed fluid loss in a control sample containing the same concentration of polyanionic cellulose as Sample 6 but lacking the silica particulates was 300 mL, a fluid loss increase of over an order of magnitude.

Table 3 likewise shows that good fluid loss performance was obtained in drilling fluid samples containing silica particulates and mixtures of partially hydrolyzed polyacrylamide and polyanionic cellulose as the viscosity-enhancing polymer. In contrast, when the silica particulates were omitted in a control sample containing the same polymer mixture, the fluid loss performance was 4-5 times poorer.

As shown in Table 4, good fluid loss performance was also observed when the drilling fluids contained a surfactant and a dispersant. Further, the rheological performance of a drilling fluid sample containing the silica particulates (Sample 10) was essentially unchanged from that of a control in which the silica particulates were absent.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A drilling method comprising:
providing a drilling fluid comprising a carrier fluid, a viscosity-enhancing polymer, and a plurality of non-biodegradable particulates, the non-biodegradable particulates comprising at least silica particulates and the silica particulates comprising precipitated amorphous silica, wherein a $d_{50}$ of the precipitated amorphous silica is less than 20 microns;
drilling a borehole in the presence of the drilling fluid; and
forming a filter cake within the borehole, the filter cake comprising the precipitated amorphous silica,
wherein the precipitated amorphous silica improves the fluid loss performance of the filter cake.

2. The drilling method of claim 1, wherein the silica particulates have a maximum size of about 40 microns.

3. The drilling method of claim 1, wherein the drilling fluid is substantially free of bentonite.

4. The drilling method of claim 1, wherein the borehole defines a portion of a water well or a mineral exploration well.

5. The drilling method of claim 1, wherein the viscosity-enhancing polymer comprises a partially hydrolyzed polyacrylamide or polyanionic cellulose.

6. The drilling method of claim 1, wherein a viscosity of the drilling fluid ranges between about 5 cP and about 35 cP.

7. The drilling method of claim 1, further comprising:
removing the filter cake from the borehole.

8. The drilling method of claim 1, wherein the silica particulates are present in the drilling fluid at a concentration of about 0.05 pounds per barrel to about 1.5 pounds per barrel.

9. The drilling method of claim 8, wherein the silica particulates are present in the drilling fluid at a concentration of about 0.1 pounds per barrel to about 0.7 pounds per barrel.

* * * * *